United States Patent
Ohtera (10) Patent No.: US 7,021,834 B2
(45) Date of Patent: Apr. 4, 2006

(54) PACKAGE MODULE

(75) Inventor: Shozo Ohtera, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 12 days.

(21) Appl. No.: 10/506,027

(22) PCT Filed: Mar. 18, 2004

(86) PCT No.: PCT/JP2004/003666

§ 371 (c)(1),
(2), (4) Date: Aug. 26, 2004

(87) PCT Pub. No.: WO2004/095104

PCT Pub. Date: Nov. 4, 2004

(65) Prior Publication Data

US 2005/0094948 A1    May 5, 2005

(30) Foreign Application Priority Data

Apr. 18, 2003  (JP)  ................... 2003-114531

(51) Int. Cl.
*G02B 6/36*  (2006.01)
(52) U.S. Cl. .................. 385/88; 385/92; 385/94
(58) Field of Classification Search .................. 385/88
See application file for complete search history.

(56) References Cited

U.S. PATENT DOCUMENTS

| | | | | |
|---|---|---|---|---|
| 5,475,783 A | * | 12/1995 | Kurashima | .................. 385/92 |
| 5,561,727 A | | 10/1996 | Akita et al. | |
| 5,960,141 A | | 9/1999 | Sasaki et al. | |
| 5,963,693 A | | 10/1999 | Mizue et al. | |

FOREIGN PATENT DOCUMENTS

| | | |
|---|---|---|
| JP | 07-225327 | 8/1995 |
| JP | 10-111437 | 4/1998 |
| JP | 11-119064 | 4/1999 |

* cited by examiner

Primary Examiner—Sung Pak
(74) Attorney, Agent, or Firm—Keating & Bennett, LL (57) ABSTRACT

A package module includes a module case and an adapter case attached to the module case. The module case accommodates a circuit board, and the adapter is used for connecting an external connector. An opening at an end of the adapter case functions as an entry to receive the external connector. Another opening at the other end functions as a connection hole to be attached to the module case. A fit-receiving portion is mounted on the upper wall adjacent to the connection hole of the adapter case in such a way that a fit-receiving opening faces down. When the module case is moved upward relative to the adapter case, a fit projection is fit into a fit-receiving portion to connect the module case and the adapter case.

8 Claims, 11 Drawing Sheets

PACKAGE MODULE

BACKGROUND OF THE INVENTION

1. Field of the Invention

The present invention relates to a package module having a module case in which a circuit board is accommodated.

2. Description of the Related Art

Figure 10:
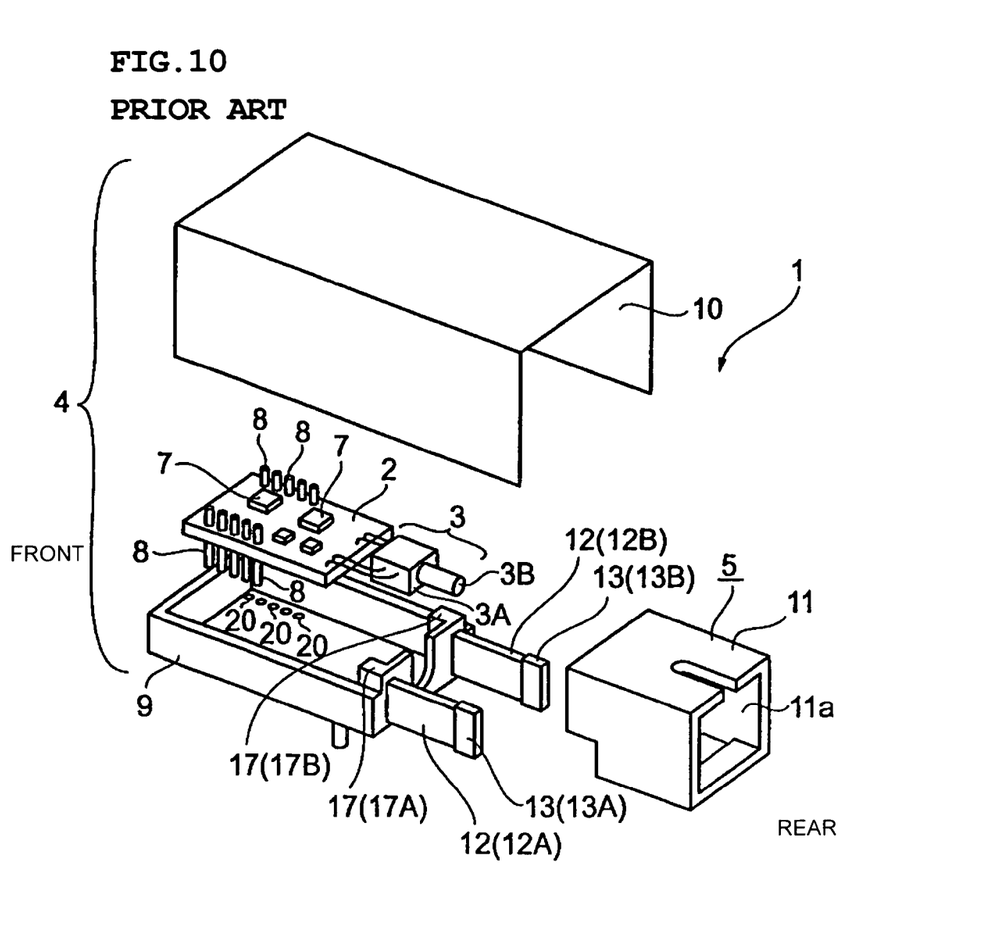
FIG. 10 is an exploded view of a conventional package module developed by the applicant of the present invention.

There are various prior art package modules having cases in which circuit boards are accommodated. One such package module is an optical communication module used for optical communications. FIG. 10 is a schematic exploded view of an optical communication module (package module) developed by the applicant of the invention described in the present application. A package module 1 includes a circuit board 2, an optical module unit 3, a module case 4 accommodating the circuit board 2 and the optical module unit 3, and an adapter 5.

The optical module unit 3 includes a circuit portion 3A and a ferrule portion 3B. The circuit portion 3A includes at least one (not shown) of a light-emitting device (e.g., laser diode (LD)) and a photoreceptor device (e.g., photodiode (PD)). In the case of the circuit portion 3A, one or both of a conversion part for converting an electric signal to an optical signal by using the light-emitting device and a conversion part for converting an optical signal to an electric signal by using the photoreceptor device is arranged.

The ferrule portion 3B includes a ferrule (not shown) through which an optical fiber (not shown) passes, a sleeve holding the ferrule, and a ferrule case accommodating the sleeve. The ferrule case is integrated with the case of the circuit portion 3A. One end of the optical fiber passing through the ferrule is exposed at an end surface of the ferrule adjacent to the circuit portion 3A, and the optical fiber is optically coupled to the light-emitting device or the photoreceptor device of the circuit portion 3A. The other end of the optical fiber is exposed at the other external end surface of the ferrule in order to establish external connection.

A unit 7 and a circuit pattern (not shown) are formed on the circuit board 2 to form a circuit. The circuit is electrically connected to a circuit of the optical module unit 3. Such a circuit of the circuit board 2 is, for example, an amplifier circuit for electric signals. In FIG. 10, terminals 8 for connecting the circuit of the circuit board 2 to an external circuit are mounted on the circuit board 2.

The module case 4 includes a base case 9 and a lid case 10. In an inner space defined by an assembly of the base case 9 and the lid case 10, the circuit board 2 and the optical module unit 3 are accommodated. The base case 9 has holes 20 formed through the bottom wall at locations corresponding to the terminals 8 of the circuit board 2. When the circuit board 2 is accommodated in the module case 4, the terminals 8 of the circuit board 2 protrude from the inside of the module case 4 to the outside through the holes 20.

On the periphery of the base case 9 of the module case 4, arms 12 (12A and 12B) are mounted. The arms 12A and 12B are separately arranged to extend out parallel to each other in a lateral direction. The arms 12A and 12B have fixing members 13 (13A and 13B) at their tips, respectively. The arms 12 and the fixing members 13 are used for fitting into an external connector (optical connector) inserted into the adapter 5, described below, to fix the external connector to the package module 1. The arms 12 and fixing members 13 can be integrally formed with the base case 9 by molding.

Figure 11:
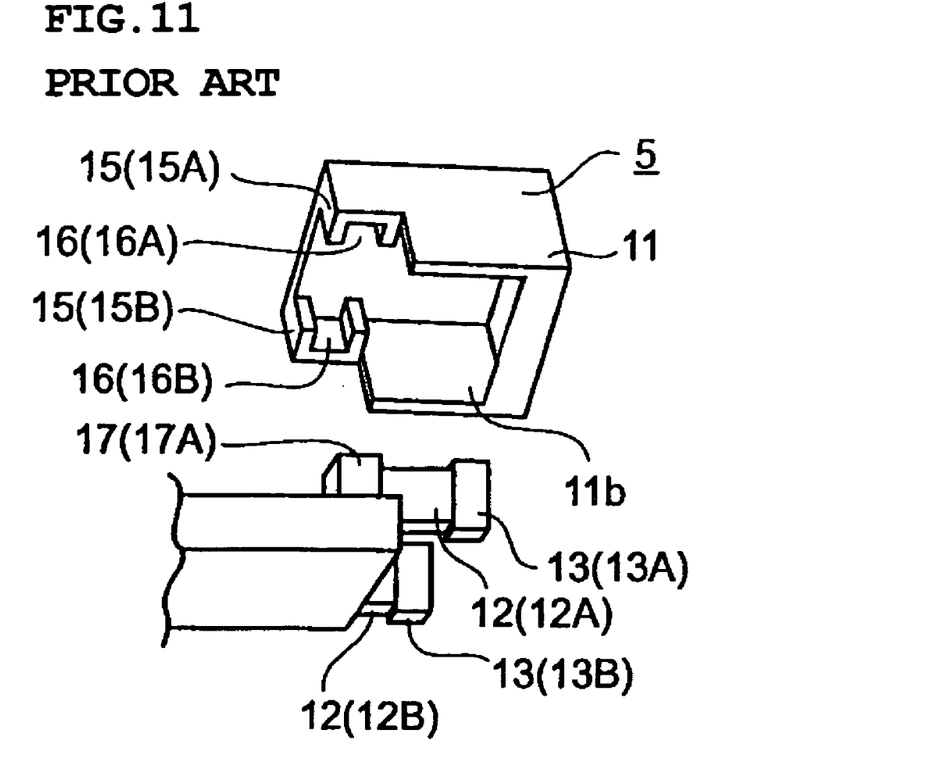
FIG. 11 is a partial view of a conventional package module shown in FIG. 10.

The adapter 5 includes an adapter case 11 to which the external connector is to be inserted. The adapter case 11 accommodates the arms 12 and fixing members 13 and is attached to the base case 9. The adapter case 11 has an entry 11a to receive an external optical connector at its rear end. As shown in FIG. 11, the adapter case 11 has an opening 11b that is open from the bottom surface to the front end surface. The opening 11b of the adapter case 11 is used for guiding the arms 12 and fixing members 13 into the inner space of the adapter case 11 when the adapter case 11 is attached to the base case 9. The adapter case 11 has fit-receiving portions 15 (15A and 15B) at the front end on the upper wall such that fit-receiving openings 16 (16A and 16B) face down.

The base case 9 has fit projections 17 (17A and 17B) projecting upward at the periphery near the arms 12 (12A and 12B). The fit projections 17 fit into the fit-receiving portions 15 of the adapter case 11. For example, the adapter case 11 is placed above the arms 12 in a position as shown in FIG. 11, and the adapter case 11 is then moved downward toward the arms 12. Therefore, the arms 12 and fixing members 13 are accommodated in the inner space of the adapter case 11 through the opening 11b of the adapter case 11, and the fit projections 17 (17A and 17B) of the base case 9 are fit into the fit-receiving portions 15 (15A and 15B) of the adapter case 11. In this way, the adapter case 11 is attached to the base case 9.

An external optical connector is inserted into the adapter case 11 attached to the base case 9 through the entry 11a, and the external optical connector is then fixed to the base case 9 (package module 1) by using the arms 12 and fixing members 13. Thereby, an end surface of an optical fiber passing through the optical connector and an end surface of an optical fiber passing through the ferrule of the optical module unit 3 are butt-joined.

Figure 12:
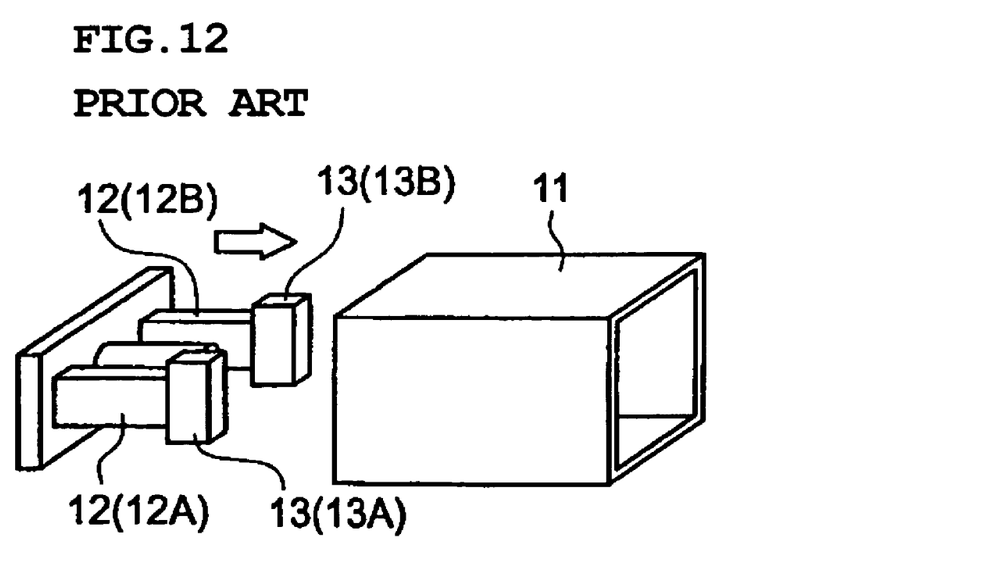
FIG. 12 is a view of a conventional adapter case and arms for fixing a connector.
Figure 13:
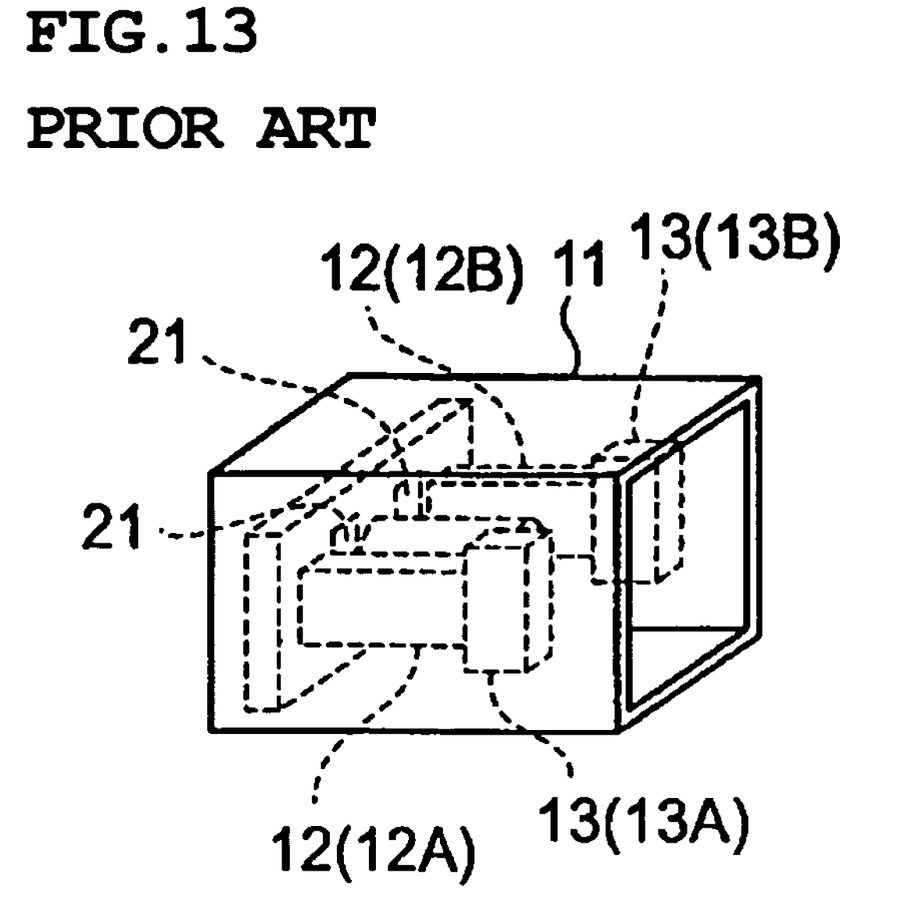
FIG. 13 is a view of another conventional adapter case and arms for fixing a connector.

In the instance shown in FIG. 10, the arms 12 are integrated with the base case 9. However, as shown in FIG. 12, the arms 12 and the fixing members 13 may be formed separately from the base case 9. In such an arrangement, for example, the arms 12 and fixing members 13 are assembled with the adapter case 11, which is formed independently, and the assembly is mounted to the base case 9 with an adhesive or the like. As shown in FIG. 13, aside from the base case 9, an integrated structure of the arms 12, fixing members 13, and the adapter case 11 may be formed by molding. In such an arrangement, the integrated structure is mounted to the base case 9 with an adhesive or the like.

In the instance shown in FIG. 12, however, a manufacturing process is complicated because the process involves the steps of forming the arms 12 and fixing members 13, forming the adapter case 11 independently thereof, assembling the arms 12 and fixing members 13 and the adapter case 11, and then joining the assembly to the base case 9 with an adhesive. Additionally, there are problems in that the reliability of strength of the package module 1 is reduced because adhesive joints lead to low bonding strength and adhesives are prone to deteriorate with age.

In FIG. 13, the adapter case 11, the arms 12, and the fixing members 13 are integrated together. Therefore, the step of assembling the adapter case 11 and both the arms 12 and the fixing members 13 is eliminated. However, for technical reasons in molding, perforations 21 shown in FIG. 13 are opened near the bases of the arms 12. The perforations 21 reduce the strength of the bases of the arms 12, thus increasing the risk of breakage of the arms 12.

In FIG. 10, the base case 9, the arms 12, and the fixing members 13 are integrated together. Therefore, it is not necessary to bond the arms 12 and the base case 9. Also, the perforations 21 resulting from molding are not formed near the bases of the arms 12. However, the adapter case 11 has the wide opening 11b at its bottom surface, and therefore, dust is apt to enter the inside of the adapter case 11 from the opening 11b. As a result, because dust is apt to enter the inside of the adapter case 11 from the opening 11b (for example, when an optical connector is inserted into the adapter case 11 in order to optically couple an optical fiber of the optical connector to an optical fiber of the optical module unit 3) the optical coupling conditions can be degraded by dust entering the adapter case 11.

SUMMARY OF THE INVENTION

In order to overcome the problems described above, preferred embodiments of the present invention provide a package module have a more reliable strength and connection.

According to the first preferred embodiment of the present invention, a package module includes a module case for accommodating a circuit board and an adapter case for attaching to the module case and for connecting to an external connector.

The adapter case includes sides with no openings, a first opening defined by the sides at one end of the adapter case for receiving the external connector, and a second opening defined by the sides at the other end of the adapter case for forming a connection hole for attaching to the module case.

A fit-receiving portion is mounted to a top of the adapter case adjacent to the second opening such that a fit-receiving opening faces in the direction toward a bottom of the adapter case.

The module case includes a fit projection to be fit into the fit-receiving portion, a projecting arm for insertion into the second opening, a pivot-point part that comes into contact with the adapter case and that functions as a pivot point of the module case when the projecting arm is inserted into the adapter case up to a specified position through the second opening, and a fixing member mounted on a tip of the arm for fixing the external connector inserted into the adapter case.

The vertical length between a bottom of the fit-receiving portion and a bottom of the second opening is smaller than the vertical length between a top of the fit projection and a bottom of the module case. The fit projection is arranged to oppose the fit-receiving opening of the fit-receiving portion by inserting the projecting arm at an incline relative to the bottom of the adapter case through the second opening up to the specified position and then pivoting the module case about the pivot-point part. Further, the fit projection is fit into the fit-receiving portion by arranging the fit projection of the module case and the fit-receiving portion of the adapter case in an opposed manner and then by moving the module case upward relative to the adapter case so that the adapter case is attached to the module case.

The package module according to the first preferred embodiment satisfies the following formulae:

$$L3 \geq Ho-t-L1$$

$$L2 = L3+t+\Delta h$$

$$\Delta h = Ho/2 - D/2 - t$$

where Ho is the outer height of the adapter case at the connection hole in the vertical direction, t is the thickness of each of the top and bottom of the adapter case, L1 is the vertical length between the top of the adapter case and the bottom of the fit-receiving portion, L2 is the vertical length between the top of the fit projection of the module case and the bottom of the module case, L3 is the vertical length between the top of the fit projection and the lowermost portion of the projecting arm including the fixing member, D is the height of the arm of the module case, and $\Delta h$ is the upward distance that the module case is moved relative to the adapter case so that the adapter case is attached to the module case after the fit projection is arranged to oppose the fit-receiving opening of the fit-receiving portion.

Preferably, the distance between the pivot-point part and a portion of the fit projection farthest away from the pivot-point part is same as the distance between the bottom of the second opening and an inner end of an outer wall of the fit-receiving portion in a package module according to the first preferred embodiment of the present invention.

According to the first preferred embodiment of the present invention, the package module further includes at least one of a light-emitting device and a photoreceptor device is disposed in the module case and an optical fiber optically coupled to the at least one of a light-emitting device and a photoreceptor device and arranged so that the package module functions as an optical communication module. The adapter case is to be connected to an optical connector having an optical fiber to be optically coupled to the optical fiber arranged in the module case.

According to the first preferred embodiment of the present invention, a package module includes a module case for accommodating a circuit board and an adapter case for attaching to the module case and for connecting to an external connector. The adapter case includes sides with no openings, a first opening defined by the sides at one end of the adapter case for receiving the external connector, and a second opening defined by the sides at the other end of the adapter case for forming a connection hole for attaching to the module case.

A fit-receiving portion is mounted to a top of the adapter case adjacent to the second opening such that a fit-receiving opening faces in the direction toward a bottom of the adapter case.

The module case includes a fit projection to be fit into the fit-receiving portion, a projecting arm for insertion into the second opening, and a fixing member mounted on a tip of the arm for fixing the external connector inserted into the adapter case.

Further, in the second preferred embodiment of the present invention, the adapter case includes an insertion stopping portion for stopping forward movement of the module case when the projecting arm is inserted into the second opening and moved forward to a position where the fit projection of the module case is opposed to the fit-receiving opening of the fit-receiving portion of the adapter case. In the second preferred embodiment of the present invention, the fit projection is fit into the fit-receiving portion by inserting the projecting arm into the second opening, moving the projecting arm along the bottom of the adapter case until the module case is stopped by the insertion stopping portion, arranging the fit projection and the fit-receiving portion in an opposed manner, and then moving the module case upward relative to the adapter case so that the adapter case is attached to the module case.

Preferably, the package module according to the second preferred embodiment includes at least one of a light-emitting device and a photoreceptor device is disposed in the module case and an optical fiber optically coupled to the at least one of a light-emitting device and a photoreceptor device and arranged so that the package module functions as an optical communication module. The adapter case is to be connected to an optical connector having an optical fiber to be optically coupled to the optical fiber arranged in the module case.

Other features, elements, steps, characteristics, and advantages of the present invention will become more apparent from the following detailed description of preferred embodiments of the present invention with reference to the attached drawings.

BRIEF DESCRIPTION OF THE DRAWINGS

FIG. 4b is a side sectional view of the package module according to the first preferred embodiment of the present invention illustrating the size conditions for the state shown in FIG. 4a.

DETAILED DESCRIPTION OF PREFERRED EMBODIMENTS

Preferred embodiments according to the present invention will be described below with reference to the drawings. In the preferred embodiments described below, the same reference numerals have been used as in the package module shown in FIG. 10 for similar elements, and common explanations of these elements are omitted.

The package module of the first preferred embodiment is an optical communication module and has a characteristic structure (slanting-arm-insertion-type) described below.

Figure 1:
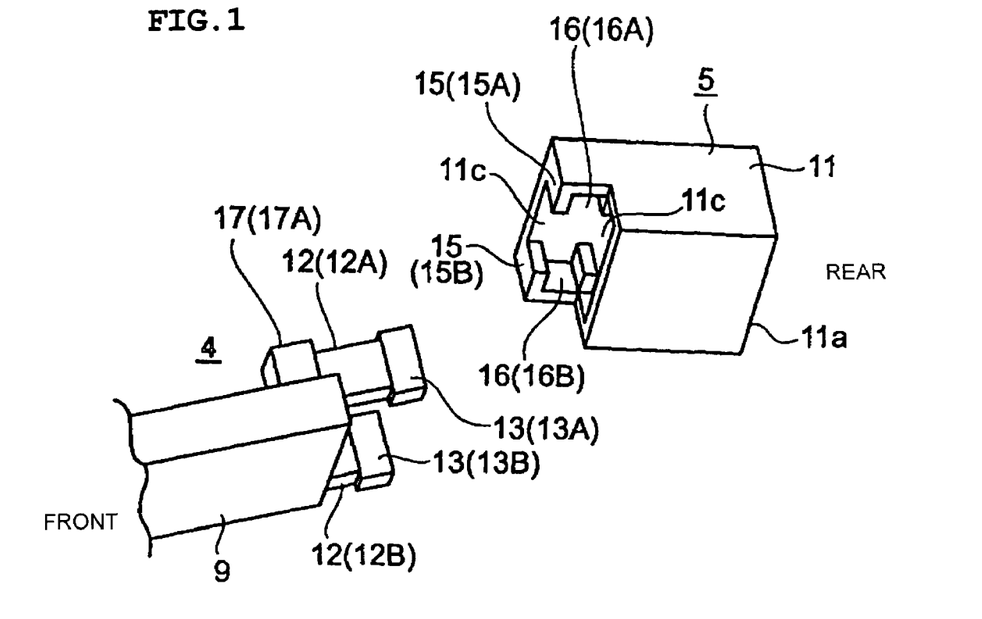
FIG. 1 is an illustration of the package module according to the first preferred embodiment of the present invention.

While the adapter case 11 of the adapter 5 shown in FIG. 10 has an opening at the bottom (see FIG. 11), the adapter case 11 of the first preferred embodiment, as shown in FIG. 1, has a closed bottom. The adapter case 11 has sides with no opening. An opening at an end of the adapter case 11 functions as an entry 11a into which an external connector (optical connector in the first preferred embodiment) is to be inserted. The other opening at the other end functions as a connection hole 11c used for attachment to a module case 4 (a base case 9).

Figure 2:
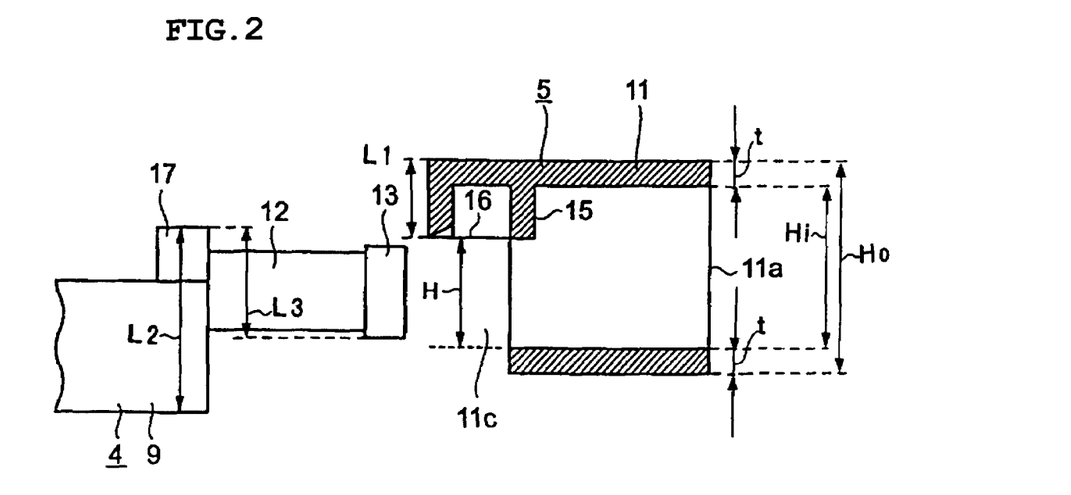
FIG. 2 is a side sectional view of the package module according to the first preferred embodiment of the present invention illustrating the dimensions of the adapter case and the module case.

Fit-receiving portions 15 (15A and 15B) are mounted to the upper wall adjacent to the connection hole 11c of the adapter case 11 such that fit-receiving openings 16 (16A and 16B) face down. Fit projections 17 (17A and 17B) for fitting into the fit-receiving portions 15 (15A and 15B) are mounted to the base case 9. In the first preferred embodiment, as shown in FIG. 2, the opening width, H, defined between the bottom of each of the fit-receiving portions 15 of the adapter case 11 and the bottom of the connection hole 11c is less than the vertical height, L2, of each of the fit projections 17 of the module case 4 (base case 9) from the bottom of the module case 4 (base case 9).

In the first preferred embodiment, the vertical length, L3, between the top of the fit projection 17 and the lowermost portion of each of the arms 12 including the fixing members 13 (i.e., the bottom of the fixing members 13 in the first preferred embodiment) is greater than or equal to the opening width H of the connection hole 11c (i.e., $L3 \geq H$). Specifically, the opening width H of the connection hole 11c is expressed by the formula, $H=Ho-t-L1$, where Ho is the outer height of the adapter case 11 in the vertical direction, Hi is the inner height of the adapter case 11 in the vertical direction, t is the thickness of each of upper and lower walls of the adapter case 11, and L1 is the vertical length between the top of the adapter case 11 and the bottom of the fit-receiving portion 15. Consequently, in the first preferred embodiment, the vertical length L3 is a dimension satisfying the formula, $L3 \geq Ho-t-L1$.

Figure 3:
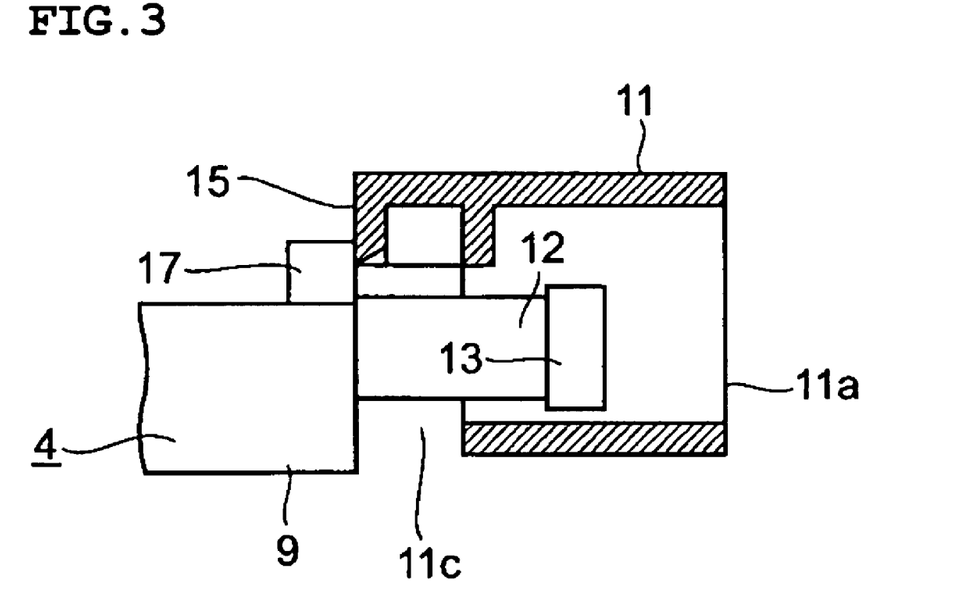
FIG. 3 is a side sectional view of the package module according to the first preferred embodiment of the present invention illustrating the fit projections of the module case engaging the outer wall of the fit-receiving portion.

Therefore, when these arms 12 and the fixing members 13 of the module case 4 are inserted into the adapter case 11 through the connection hole 11c of the adapter case 11 and the arms 12 are then moved forward along the bottom wall in order to attach the adapter case 11 to the module case 4, as shown in FIG. 3, the fit projections 17 of the module case 4 come into contact with the outer wall surface of the fit-receiving portions 15 of the adapter case 11. Thus, the forward movement of the module case 4 stops. This prevents the fit projections 17 of the module case 4 from fitting into the fit-receiving portions 15 of the adapter case 11.

Figure 5A:
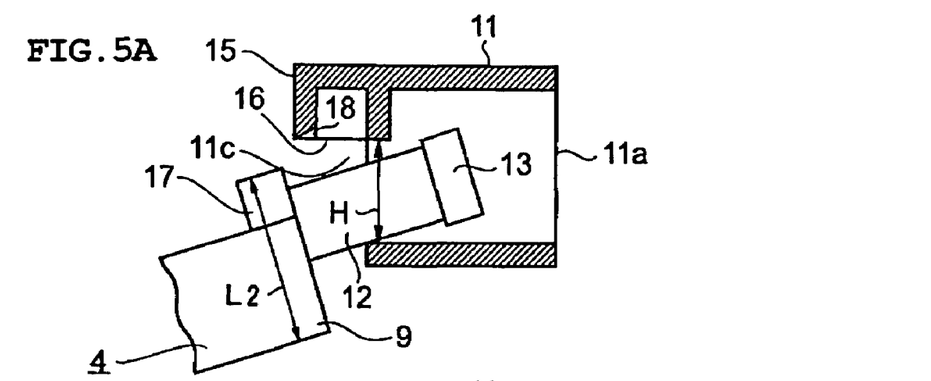
FIGS. 5a, 5b, 5c, and 5d are side sectional views illustrating the assembly of the package module according to the first preferred embodiment of the present invention.

In the first preferred embodiment, attaching the adapter case 11 to the module case 4 (base case 9) is performed by the steps described below. As shown in FIG. 5a, the fixing members 13 and the arms 12 are inserted into the adapter case 11 through the connection hole 11c of the adapter case 11 while the base case 9 and arms 12 are inclined in an upward direction to the bottom surface of the adapter case 11.

Figure 5B:
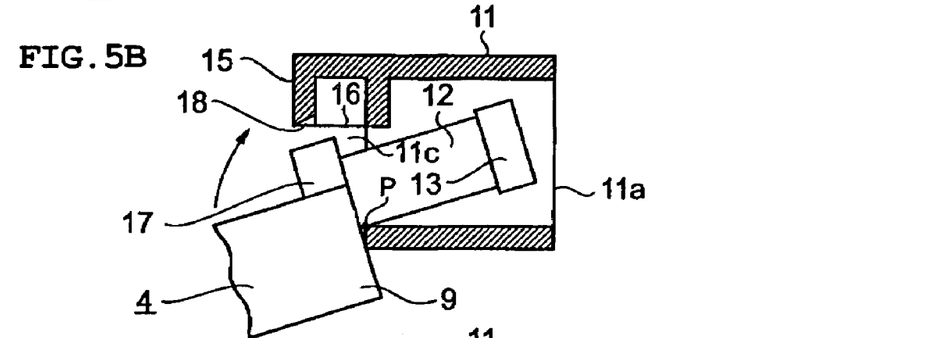

When the insertion of the arms 12 and the fixing members 13 continues, as shown in FIG. 5b, the outer wall of the base case 9 contacts the edge of the bottom wall of the adapter case 11, thus stopping the insertion of the base case 9 and the arms 12. In the first preferred embodiment, the length of each of the arms 12 is designed such that the fixing members 13 do not contact the upper wall of the adapter case 11 before the outer wall of the base case 9 contacts the bottom wall of the adapter case 11. In the preferred embodiment shown in FIG. 5b, when the outer wall of the base case 9 contacts the edge of the bottom wall of the adapter case 11, the fixing members 13 do not contact the upper wall of the adapter case

11. However, the fixing members 13 may contact the upper wall of the adapter case 11 at the same time the outer wall of the base case 9 contacts the edge of the bottom wall of the adapter case 11.

Figure 5C:
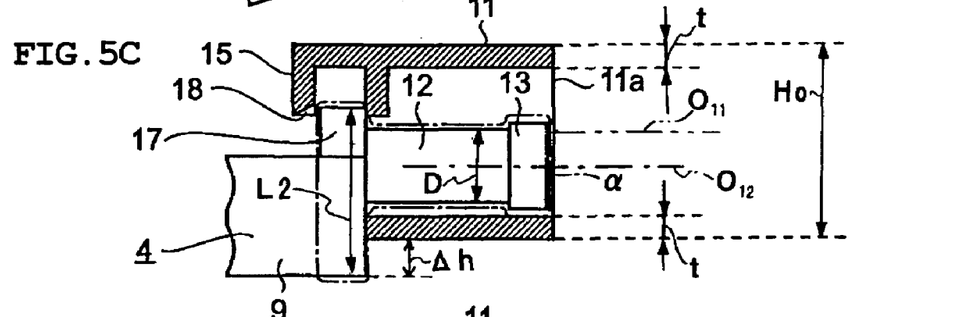

The base case 9 and the arms 12 are then pivoted about contact part P serving as a pivot point. The contact part P contacts the edge of the bottom wall of the adapter case 11 until the base case 9 and the arms 12 are substantially horizontal to the bottom surface of the adapter case 11, as shown in FIG. 5c. In the first preferred embodiment, the contact part P of the arms 12 (where the arms 12 contacts the edge of the bottom wall of the adapter case 11 when the insertion of the arms 12 stops) function as pivot-point parts.

Figure 4A:
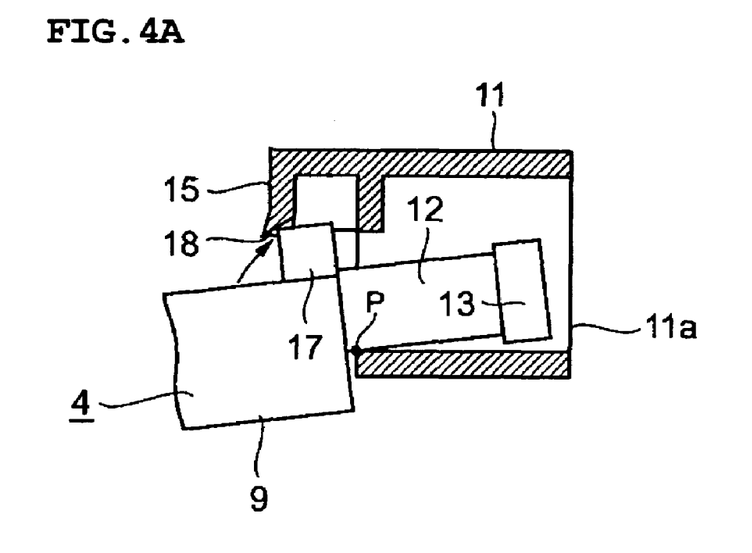
FIG. 4a is a side sectional view of the package module according to the first preferred embodiment of the present invention illustrating an operation in a step of assembling the package module.

In the first preferred embodiment, during pivoting of the base case 9 and the arms 12, the top of the fit projections 17 contact the opening edges of the fit-receiving portions 15 of the adapter case 11. As shown in FIG. 4a, a wall defining the fit-receiving openings is slightly deformed during the pivoting of the base case 9 and the arm 12. Therefore, in the first preferred embodiment, the distance β1 between each of the pivot-point parts P of the module case 4 and a point Q (see FIG. 4b) of each of the corresponding fit projections 17 farthest away from the pivot-point part P is slightly longer than the distance β2 between a lower end X of the connection hole 11c of the adapter case 11 and an inner end Y of each of the fit-receiving openings of the fit-receiving portions 15.

Moreover, in the first preferred embodiment, in order to facilitate a pivoting operation of the base case 9 and the arms 12 while the fit projections 17 contact the opening edges of the fit-receiving portions 15, the inner ends 18 of the fit-receiving openings of the fit-receiving portions 15 are removed or rounded. In place of removed or rounded inner ends 18, contact parts of the fit projections 17 in contact with the fit-receiving portions may be removed or rounded.

Furthermore, in the first preferred embodiment, the positions of the fit-receiving portions 15 and the fit projections 17 are designed such that, when the base case 9 and the arms 12 are horizontal to the bottom surface of the adapter case 11 by being pivoted, the fit projections 17 of the base case 9 (module case 4) are opposed to the fit-receiving openings 16 of the fit-receiving portions 15 of the adapter case 11.

Figure 5D:
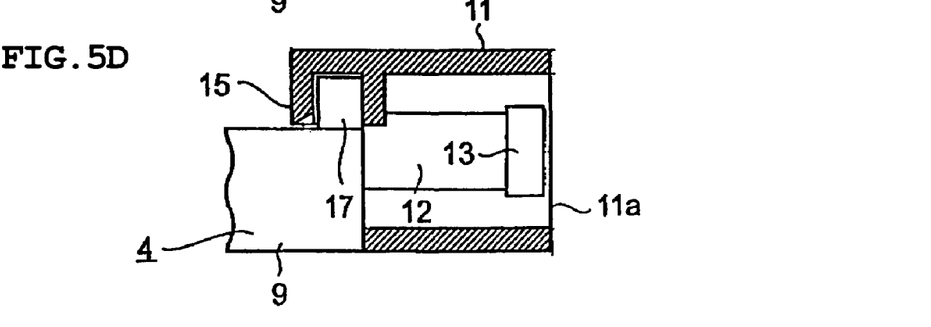

After the base case 9 and the arms 12 are positioned horizontal to the bottom surface of the adapter case 11 by being pivoted thereof, as shown in FIG. 5d, the module case 4 is moved upward relative to the bottom surface of the adapter case 11. Thereby, the fit projections 17 of the module case 4 are fit into the fit-receiving portions 15 of the adapter case 11. Attaching the adapter case 11 to the base case 9 (module case 4) is thus completed.

In the first preferred embodiment, when the fit projections 17 are fit into the fit-receiving portions 15, the bottom of the adapter case 11 is flush with the bottom of the module case 4, and the center line $O_{12}$ (see FIG. 5c) of each of the arms 12 of the module case 4 matches in the longitudinal direction with the center position $O_{11}$ of the adapter case 11. Specifically, the upward distance Δh is given by the formula:

$$\Delta h = Ho/2 - D/2 - t$$

where Δh is the upward distance of the module case 4 (base case 9) relative to the adapter case 11 when the module case 4 is shifted from a state shown in FIG. 5c to that in FIG. 5d and D is the height of the arms 12. The vertical length L2 between each of the tops of the fit projections 17 of the module case 4 and the bottom of the module case 4 is a dimension satisfying the formula L2=L3+t+Δh.

In the first preferred embodiment, the fit projections 17, a periphery of the base case 9 where the fit projections 17 are mounted, the arms 12, and the fixing members 13 constitute an adapter-case connection section a that is inserted into the adapter case through the connection hole 11c of the adapter case 11 (see FIG. 5c).

In the first preferred embodiment, a package module 1 is assembled by combining the base case 9 in which the circuit board 2 and the optical module unit 3 are accommodated with a lid case 10 after the base case 9 is attached to the adapter case 11. When attached to the base case 9 (module case 4), the adapter case 11 has a single opened portion, the entry 11a. When an optical connector is inserted into the adapter case 11, the entry 11a is substantially blocked with the optical connector. This keeps dust from externally entering the adapter case 11 when an optical fiber of the inserted optical connector is optically coupled to an optical fiber passing through a ferrule of the optical module unit 3. As a result, when the optical connector is inserted to or extracted from the adapter case 11, degradation of the optical coupling conditions resulting from dust is avoided.

Figures 9A, 9B:
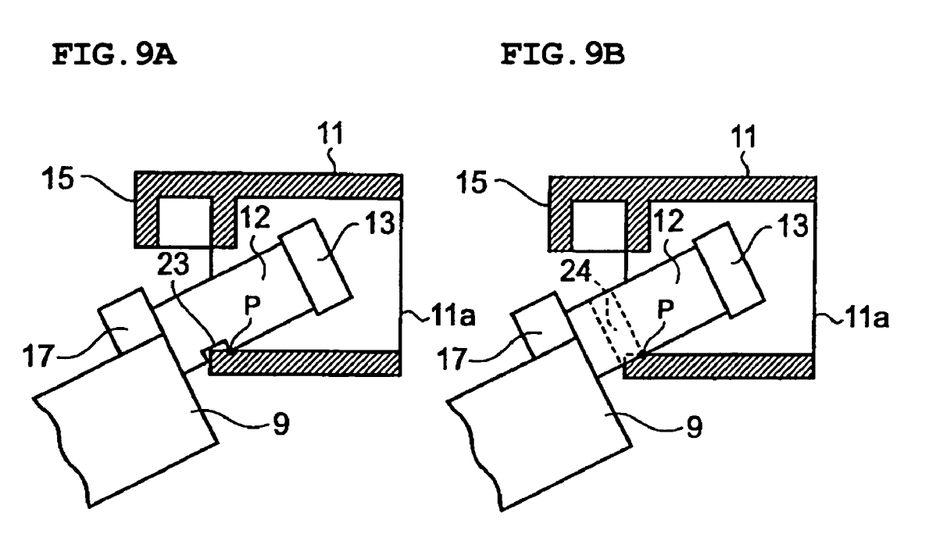
FIGS. 9a and 9b are views illustrating a modification of the package module according to the first preferred embodiment of the present invention.

In the first preferred embodiment, the bottom of the base of the arm 12 is higher than the bottom surface of the base case 9. At the time of the insertion of these arms 12 to the adapter case 11, an outer portion of the base case 9 under the bottom of each of the bases of the arms 12 contacts the bottom wall of the adapter case 11, and thereby stopping the insertion of the arms 12. The arms 12 may be modified to have recesses 23 in the bottom at the bases or the adjacent areas, as shown in FIG. 9a, so that inner surfaces of the recesses 23 stop the insertion of the arms 12. When the arms 12 have the recesses 23 shown in FIG. 9a or slots 24 shown in FIG. 9b, portions P at the opening edges of the recesses 23 or the slots 24 function as pivot-point parts.

Moreover, as an alternative to stopping by the lower outer portion of the base case 9 or the recesses 23 of the arms 12, the fixing members 13 may stop the insertion of the arms 12 by coming into contact with the upper wall of the adapter case 11.

Figure 4B:
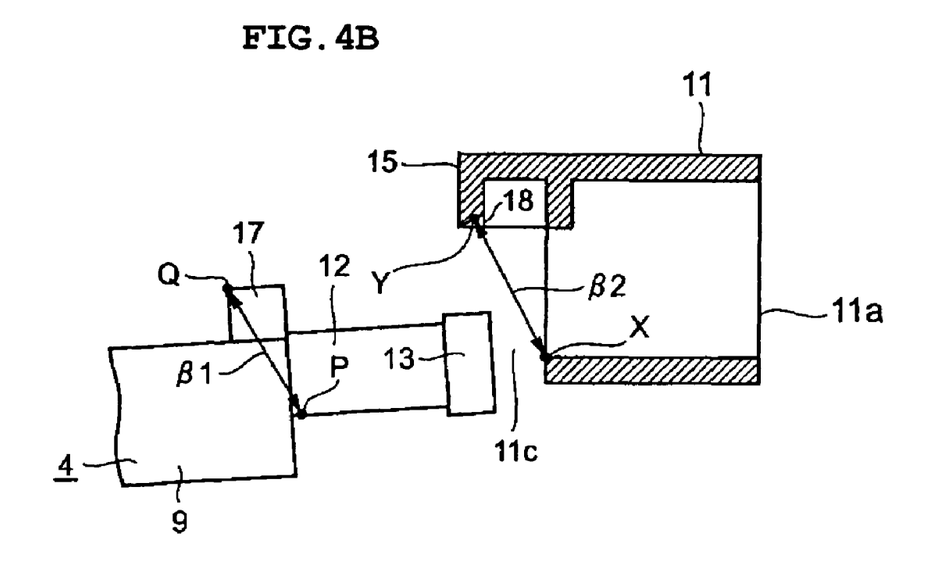

Additionally, in the first preferred embodiment, in a step of attaching the adapter case 11 to the module case 4, the top of the fit projections 17 contact the opening edges of the fit-receiving portions 15 during pivoting of the module case 4. However, the top of the fit projections 17 may not contact the opening edges of the fit-receiving portions 15. In such an arrangement, the vertical length L3 between the top of each of the fit projections 17 of the module case 4 and the lowermost part of each of the fixing members 13 satisfies the formula, L3≧Ho−t−L1, and the distance β1 between Q and P shown in FIG. 4b is shorter than the distance β2 between X and Y (β1<β2). In the structure in which the top of the fit projections 17 do not contact the opening edges of the fit-receiving portions 15, if a package module is significantly small, the dimensions of the fit between the fit-receiving portions 15 and the fit projections 17 are small. Therefore, the fit between them is susceptible to a disconnection. Therefore, in a small package module, a structure is preferable in which the top of the fit projections 17 contact the opening edges of the fit-receiving portions 15 to have larger dimensions between the fit-receiving portions 15 and the fit projections 17.

A second preferred embodiment will now be described below. In the second preferred embodiment, the same reference numerals have been used as in the first preferred embodiment for similar elements, and common explanations of these elements are omitted.

In the second preferred embodiment, a horizontal-arm-insertion-type package module is described. Specifically, in the second preferred embodiment, the vertical length L3 (see FIG. 2) between the top of each of the fit projections 17 of the module case 4 and the bottom of the fixing member 13 satisfies the formula, L3≦Ho−t−L1. In other words, the vertical length L3 is smaller than the opening width H (H=Ho−t−L1) of the connection hole 11c of the adapter case 11.

Figure 6A:
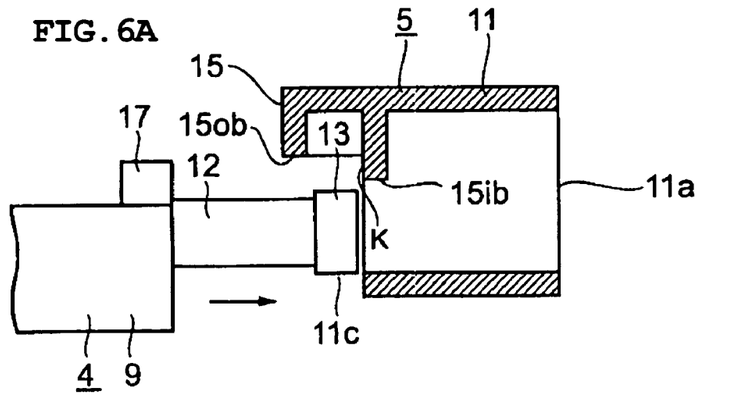
FIGS. 6a, 6b, and 6c are side sectional views illustrating the assembly of the package module according to the second preferred embodiment of the present invention.

In the second preferred embodiment, therefore, the adapter case 11 is attached to the module case 4 in the following way. As shown in FIG. 6a, the arms 12 and the fixing members 13 of the module case 4 are inserted into the adapter case 11 through the connection hole 11c of the adapter case 11, and the module case 4 is moved forward relative to the adapter case 11 while the arms 12 are moved along the bottom of the adapter case 11.

Figure 6B:
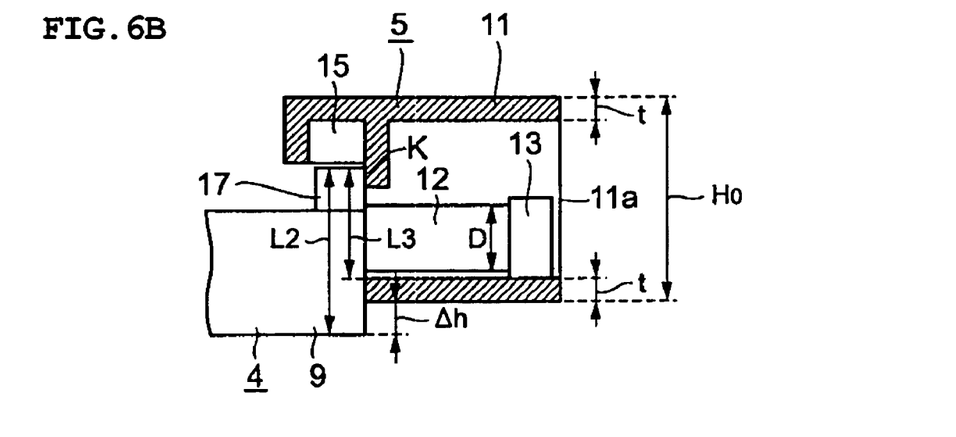

In the second preferred embodiment, the bottom 15ib of an internal section of each of the fit-receiving portions 15 of the adapter case 11 is lower than the bottom 15ob of an external section of the fit-receiving portion 15. Therefore, as shown in FIG. 6b, when the module case 4 is moved forward until the fit projection 17 of the module case 4 reach a location opposed to the fit-receiving openings of the fit-receiving portions 15 of the adapter case 11, the fit projections 17 contact an inner end of the internal section of each of the fit-receiving portions 15, thereby stopping the forward movement of the module case 4. In the second preferred embodiment, the inner end K of the internal section of the fit-receiving portion 15 functions as an insertion stopping part.

Figure 6C:
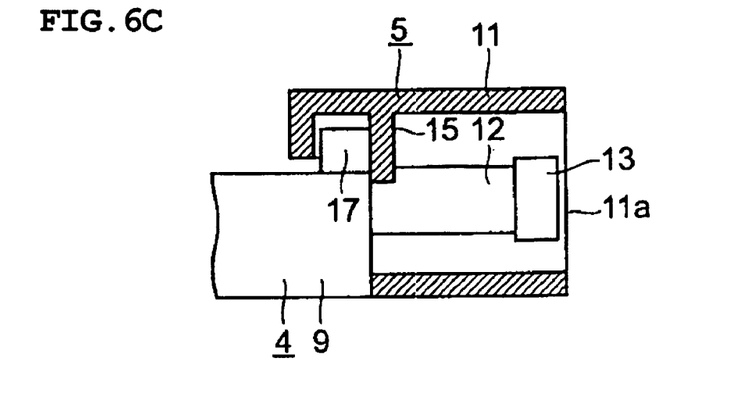

As shown in FIG. 6c, the fit projections 17 of the module case 4 fit into the fit-receiving portions 15 of the adapter case 11 by moving the module case 4 upward relative to the adapter case 11. In the second preferred embodiment, as with the first preferred embodiment, when the fit projections 17 are fit into the fit-receiving portions 15, the bottom of the adapter case 11 is flush with the bottom of the module case 4. Also, the center line of each of the arms 12 in the longitudinal direction matches with the center line of the adapter case 11. Specifically, the upward distance Δh (see FIG. 6b) that the module case 4 is shifted from a state shown in FIG. 6b to the state shown in FIG. 6d is given by the formula Δh=Ho/2−D/2−t. The vertical length L2 between each of the top of the fit projections 17 of the module case 4 and the bottom of the module case 4 satisfies the formula, L2=L3+t+Δh.

As described above, the adapter case 11 is attached to the module case 4 in the second preferred embodiment.

The attachment of the adapter case 11 to the module case 4 in the second preferred embodiment is easier than that in the first preferred embodiment. However, the adapter case 11 can be readily detached from the module case 4. Therefore, the following arrangements may be provided.

Figure 7A:
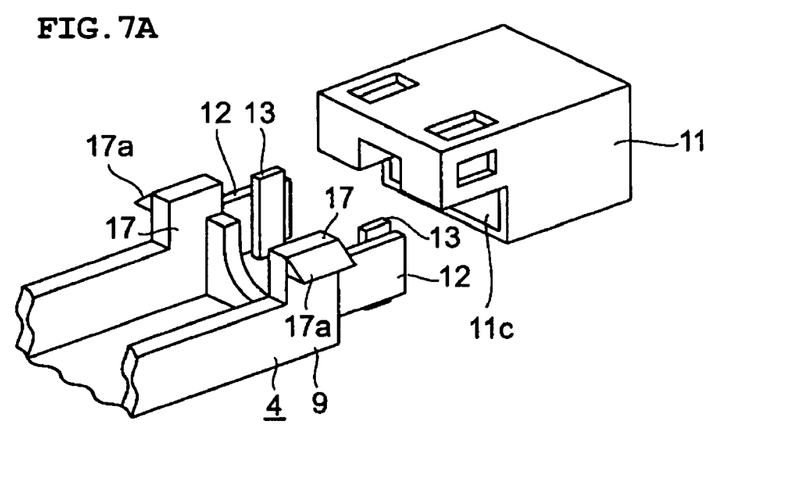
FIGS. 7a, 7b, and 7c are views illustrating a modification of the package module according to the second preferred embodiment of the present invention.
Figure 7B:
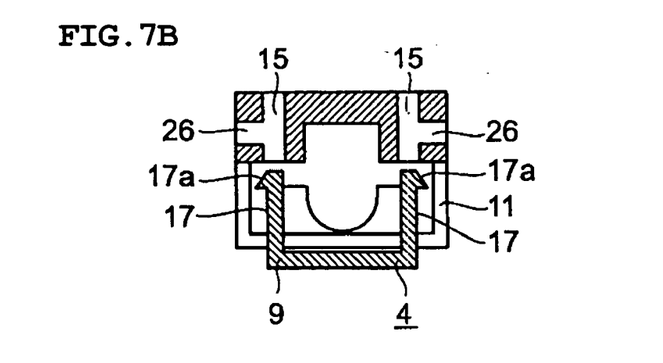
Figure 7C:
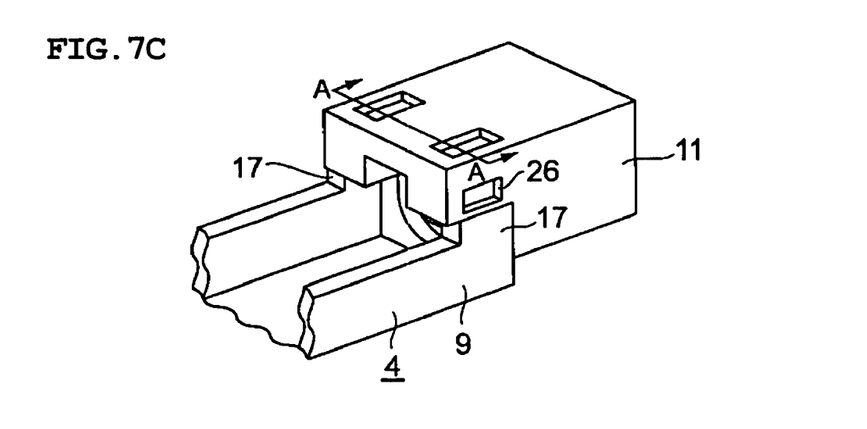

For example, as shown in FIG. 7a, the fit projections 17 of the module case 4 have external fixing members 17a at their tips. FIG. 7c illustrates that the arms 12 of the module case 4 (shown in FIG. 7a) are inserted into the adapter case 11 through the connection hole 11c of the adapter case 11 until the fit projections 17 are opposed to the fit-receiving openings of the fit-receiving portions 15. FIG. 7b is a cross-sectional view taken along line A—A of FIG. 7c. As shown in FIG. 7b, nail engaging portions 26 engage the external fixing members 17a of the fit projections 17 when the fit projections 17 are fit into the fit-receiving portions 15 to prevent disconnection of the adapter case 11 and the module case 4. In this modification of the second preferred embodiment, the nail engaging parts 26, including an opening, are arranged to oppose the external fixing members 17a of the fit projections 17 when the fit projections 17 of the module case 4 are fit into the fit-receiving portions 15 of the adapter case 11 and when the bottom of the module case 4 is flush with that of the adapter case 11. The external fixing members 17a of the fit projections 17 engage the nail engaging parts 26 of the fit-receiving portions 15 so as not to be disconnected, and therefore, the bottom of the module case 4 is held to be flush with the bottom of the adapter case 11. Additionally, the adapter case 11 is kept from being disconnected from the module case 4 with reliability.

In this modification of the second preferred embodiment, the external fixing members 17a mounted on the tips of the fit projections 17 project outwardly. However, in another modification of the second preferred embodiment, the external fixing members 17a may project inwardly. In such an arrangement, the nail engaging parts 26 of the fit-receiving portions 15 of the adapter case 11 are positioned in locations corresponding to where the external fixing members 17a are formed.

Figure 8A:
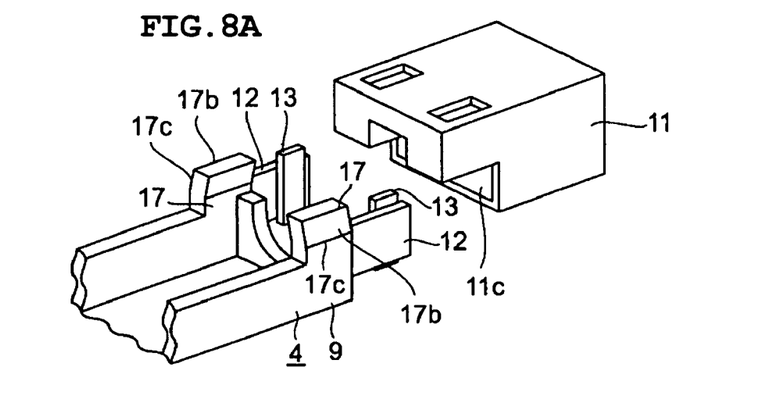
FIGS. 8a, 8b, 8c, and 8d are views illustrating another modification of the package module according to the second preferred embodiment of the present invention.
Figure 8B:
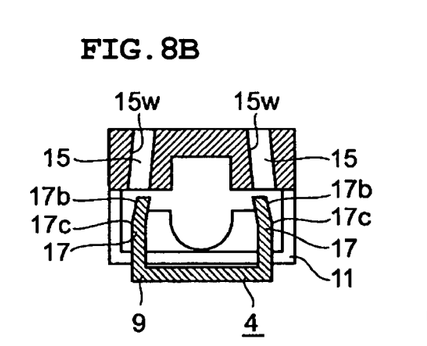
Figure 8C:
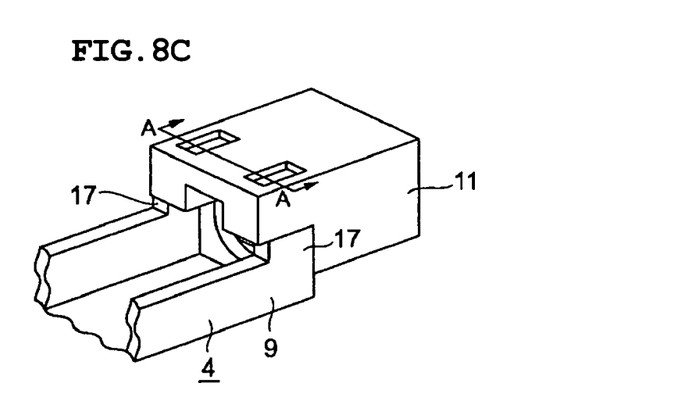

The arrangement described below may be provided to prevent the adapter case 11 from being disconnected from the module case 4. As shown in FIG. 8b, the fit-receiving portions 15 of the adapter case 11 have walls 15w for conforming to sidewalls of the fit projections 17, and the walls 15w inwardly incline. As shown in FIGS. 8a and 8b, the fit projections 17 of the module case 4 have bends 17c for inwardly bending the leading ends of the fit projections 17, and tips from the bends 17c onward are tapered portions 17b. FIG. 8c illustrates that the arms 12 of the module case 4 shown in FIG. 8a are inserted into the adapter case 11 through the connection hole 11c of the adapter case 11 and the fit projections 17 are opposed to the fit-receiving openings of the fit-receiving portions 15. FIG. 8b is a cross-sectional view taken along line A—A of FIG. 8c.

Figure 8D:
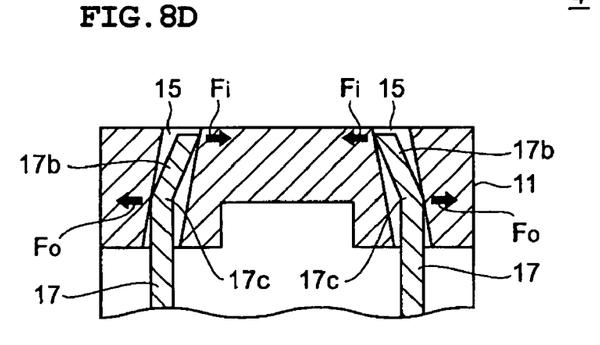

In this arrangement of the fit-receiving portions 15 and fit projections 17, when the fit projections 17 are inserted into the fit-receiving portions 15, the fit projections 17 are moved upward into the fit-receiving portions 15 while being elastically deformed in an inward direction due to the slope of the walls 15w of the fit-receiving portions 15. A state shown in FIG. 8d is the result. Specifically, the tips of the fit projections 17 contact the inner surfaces of the fit-receiving portions 15 and press the contact surfaces with a pressure of Fi in an inward direction. The bends 17c of the fit projections 17 contact the outer surfaces of the fit-receiving portions 15 and press the contact surfaces with a pressure of Fo in an outward direction. The pressures Fi and Fo enable the fit projections 17 to be fastened to the fit-receiving portions 15, and therefore, the fit projections 17 are less prone to being disconnected from the fit-receiving portions 15.

In this modification of the second preferred embodiment, the tapered portions 17b of the fit projections 17 are inwardly tapered. However, the tapered portions 17b may also be outwardly tapered. The walls 15w of the fit-receiving portions 15 are inwardly inclined. However, the walls 15w may be outwardly inclined.

The present invention is not limited to the first and the second preferred embodiments and may have various other embodiments. For example, in the first and second preferred embodiments, the base case 9 has the fit projections 17 at its periphery, but the fit projections 17 may be mounted on the base of the arms 12. In the first and second preferred embodiments, the module case 4 has the base case 9 and the lid case 10 in such a way that both cases are apart in a vertical direction, but the module case 4 may have another structure.

Additionally, in the first and second preferred embodiments, the bottom of each of the fixing members 13 is lower than that of each of the arms 12, but the bottoms may be flush. The bottom of the fixing member 13 may be higher than that of the arm 12. In such an arrangement, because the lowermost part of the arm 12 including the fixing member 13 is the bottom of the arm 12, the vertical length L3 is defined between the bottom of the arm 12 and each of the tops of the fit projections 17.

Moreover, the arrangement of the first preferred embodiment may include the modifications shown in FIGS. 7a to 7c and FIGS. 8a to 8d.

The package modules according to the first and second preferred embodiments are preferably optical communication modules. However, the present invention may be of any module other than optical communication module, including any package module that accommodates a circuit board in a module case. For example, the present invention is applicable to a high-frequency circuit module in which a high-frequency circuit disposed on a circuit board is accommodated in a case or a circuit module having a circuit through which low-frequency current or direct current passes.

As described above, the present invention has high reliability of strength and connector connection and facilitates cost reduction by simplifying a manufacturing process. Therefore, it is effective to apply the present invention to a general-purpose package module.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A package module comprising:
a module case for accommodating a circuit board; and
an adapter case for attaching to the module case and for connecting to an external connector; wherein
the adapter case includes:
sides with no openings;
a first opening defined by the sides at one end of the adapter case for receiving the external connector; and
a second opening defined by the sides at the other end of the adapter case for forming a connection hole for attaching to the module case;
a fit-receiving portion is mounted to a top of the adapter case adjacent to the second opening such that a fit-receiving opening faces in the direction toward a bottom of the adapter case;
the module case includes:
a fit projection to be fit into the fit-receiving portion;
a projecting arm, for insertion into the second opening;
a pivot-point part that comes into contact with the adapter case and that functions as a pivot point of the module case when the projecting arm is inserted into the adapter case up to a specified position through the second opening; and
a fixing member mounted on a tip of the arm for fixing the external connector inserted into the adapter case;
the vertical length between a bottom of the fit-receiving portion and a bottom of the second opening is smaller than the vertical length between a top of the fit projection and a bottom of the module case;

the fit projection is arranged to oppose the fit-receiving opening of the fit-receiving portion by inserting the projecting arm at an incline relative to the bottom of the adapter case through the second opening up to the specified position and then pivoting the module case about the pivot-point part; and the fit projection is fit into the fit-receiving portion by arranging the fit projection of the module case and the fit-receiving portion of the adapter case in an opposed manner and then by moving the module case upward relative to the adapter case so that the adapter case is attached to the module case.

2. The package module according to claim 1, wherein the following formulae are satisfied:

$$L3 \geq Ho-t-L1$$

$$L2=L3+t+\Delta h$$

$$\Delta h=Ho/2-D/2-t$$

where Ho is the outer height of the adapter case at the connection hole in the vertical direction;
t is the thickness of each of the top and bottom of the adapter case;
L1 is the vertical length between the top of the adapter case and the bottom of the fit-receiving portion;
L2 is the vertical length between the top of the fit projection of the module case and the bottom of the module case;
L3 is the vertical length between the top of the fit projection and the lowermost portion of the projecting arm including the fixing member;
D is the height of the arm of the module case; and
Δh is the upward distance that the module case is moved relative to the adapter case so that the adapter case is attached to the module case after the fit projection is arranged to oppose the fit-receiving opening of the fit-receiving portion.

3. The package module according to claim 1, wherein the distance between the pivot-point part and a portion of the fit projection located farthest away from the pivot-point part is the same as or slightly larger than the distance between the bottom of the second opening and an inner end of an outer wall of the fit-receiving portion.

4. The package module according to claim 1, further including:
at least one of a light-emitting device and a photoreceptor device is disposed in the module case; and
an optical fiber optically coupled to said at least one of a light-emitting device and a photoreceptor device and arranged so that the package module functions as an optical communication module; wherein
the adapter case is to be connected to an optical connector having an optical fiber to be optically coupled to the optical fiber arranged in the module case.

5. A package module comprising:
a module case for accommodating a circuit board; and
an adapter case for attaching to the module case and for connecting to an external connector; wherein
the adapter case includes:
sides with no openings;
a first opening defined by the sides at one end of the adapter case for receiving the external connector; and a second opening defined by the sides at the other end of the adapter case for forming a connection hole for attaching to the module case;

a fit-receiving portion is mounted to a top of the adapter case adjacent to the second opening such that a fit-receiving opening faces in the direction toward a bottom of the adapter case;

the module case includes:
- a fit projection to be fit into the fit-receiving portion;
- a projecting arm for insertion into the second opening; and
- a fixing member mounted on a tip of the arm for fixing the external connector inserted into the adapter case;

the adapter case further includes an insertion stopping portion for stopping forward movement of the module case when the projecting arm is inserted into the second opening and moved forward to a position where the fit projection of the module case opposes the fit-receiving opening of the fit-receiving portion of the adapter case; and the fit projection is fit into the fit-receiving portion by inserting the projecting arm into the second opening, moving the projecting arm along the bottom of the adapter case until the module case is stopped by the insertion stopping portion, arranging the fit projection and the fit-receiving portion in an opposed manner, and then moving the module case upward relative to the adapter case so that the adapter case is attached to the module case.

6. The package module according to claim 5, further including:
- at least one of a light-emitting device and a photoreceptor device is disposed in the module case; and
- an optical fiber optically coupled to said at least one of a light-emitting device and a photoreceptor device and arranged so that the package module functions as an optical communication module; wherein
- the adapter case is to be connected to an optical connector having an optical fiber to be optically coupled to the optical fiber arranged in the module case.

7. A method for manufacturing a package module including:
- a module case for accommodating a circuit board; and
- an adapter case for connecting the module case and for connecting to an external connector; wherein
- the adapter case includes:
  - sides with no openings;
  - a first opening defined by the sides of the adapter case at one end for receiving the external connector; and
  - a second opening defined by the sides of the adapter case at the other end for forming a connection hole for being attached to the module case;
- a fit-receiving portion is mounted to a top of the adapter case adjacent to the second opening;
- the module case includes:
  - a fit projection to be fit into the fit-receiving portion of the adapter case;
  - a projecting arm for insertion into the second opening; and
  - a pivot-point part that comes into contact with the adapter case and that functions as a pivot point of the module case when the projecting arm is inserted into the adapter case up to a specified position through the second opening; and the vertical length between a bottom of the fit-receiving portion and a bottom of the second opening is smaller than the vertical length between a top of the fit projection and a bottom of the module case, the method comprising the steps of:

inserting the projecting arm at an incline relative to the bottom of the adapter case through the second opening up to the specified position;

pivoting the adapter-case connection section about the pivot-point part of the projecting arm so that the fit projection of the module case and the fit-receiving portion of the adapter case are arranged in an opposed manner; and fitting the fit projection into the fit-receiving portions by moving the module case upward relative to the adapter case so that the adapter case is attached to the module case.

8. A method for manufacturing a package module including:
- a module case for accommodating a circuit board; and
- an adapter case for connecting the module case and for connecting to an external connector; wherein
- the adapter case includes:
  - sides with no openings;
  - a first opening defined by the sides of the adapter case at one end for receiving the external connector; and
  - a second opening defined by the sides of the adapter case at the other end for forming a connection hole for being attached to the module case;
- a fit-receiving portion is mounted to a top of the adapter case adjacent to the second opening;
- the module case includes:
  - a fit projection to be fit into the fit-receiving portion;
  - a projecting arm for insertion into the second opening; and
  - a fixing member mounted on a tip of the arm for fixing the external connector inserted into the adapter case;
- the adapter case further includes an insertion stopping portion for stopping forward movement of the module case when the projecting arm is inserted into the second opening and moved forward to a position where the fit projection of the module case opposes the fit-receiving opening of the fit-receiving portion of the adapter case, the method comprising the steps of:

inserting the projecting arm along the bottom of the adapter case until the module case is stopped by the insertion stopping portion;

moving the module case forward while moving the arm of the adapter-case connection section along the bottom wall of the adapter case until the adapter-case connection section is stopped by the insertion stopping portion;

arranging the fit projection and the fit-receiving portion in an opposed manner; and moving the module case upward relative to the adapter case so that the adapter case is attached to the module case.

* * * * *